March 20, 1945. A. P. FERGUESON ET AL 2,372,069
FENDER SHIELD FASTENER
Filed Feb. 3, 1941 2 Sheets-Sheet 1
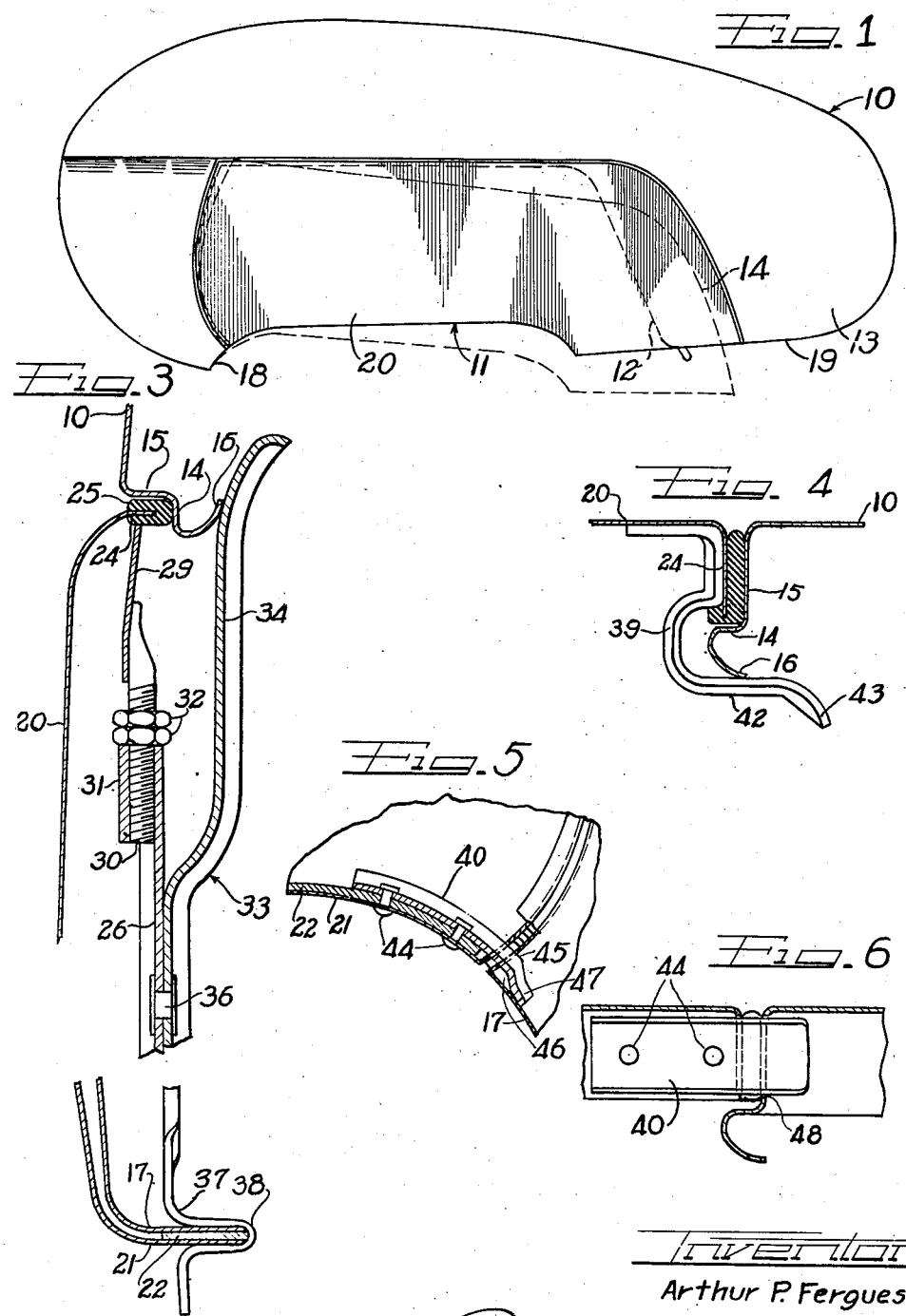
Inventors
Arthur P. Fergueson
George W. Schatzman

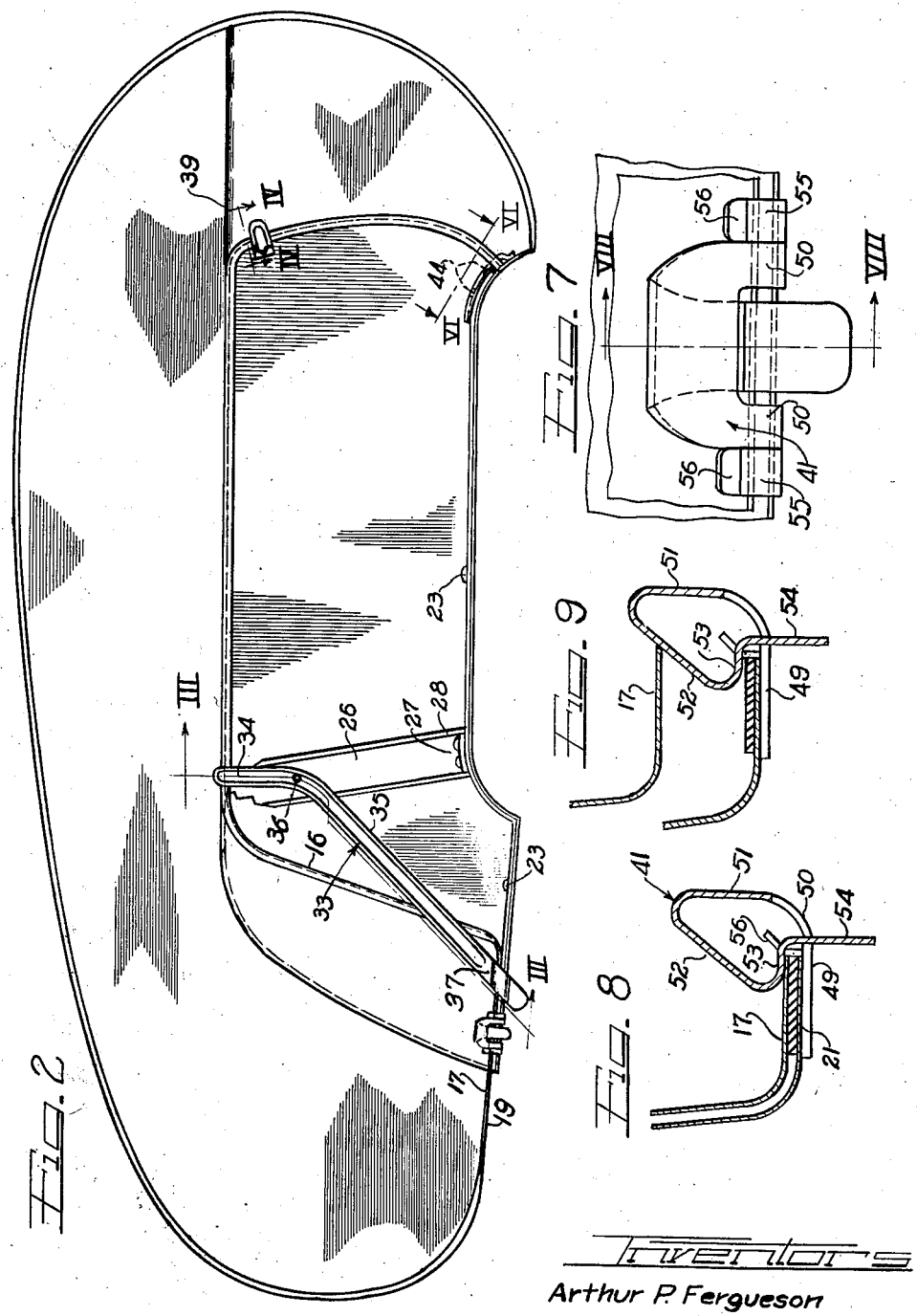

Patented Mar. 20, 1945

2,372,069

UNITED STATES PATENT OFFICE 2,372,069

FENDER SHIELD FASTENER

Arthur P. Fergueson and George W. Schatzman, Detroit, Mich., assignors to Houdaille-Hershey Corporation, Detroit, Mich., a corporation of Michigan Application February 3, 1941, Serial No. 377,175

3 Claims. (Cl. 292—87)

This invention relates to fender shield and fender shield assemblies, and more particularly, to a fender shield having novel mounting means thereon for detachably securing the fender shield to the fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to and removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a fender shield of novel construction and characteristics and particularly a fender shield having a novel means for securing the fender shield to a vehicle fender.

It is a further object of this invention to provide a fender shield and fender shield assembly which is economical to manufacture and which is rugged and reliable in use.

It is a still further object of the present invention to provide novel means for supporting and clamping the forward and rear ends of a fender shield on a vehicle fender.

Another object of this invention is to provide a novel fender shield construction having a reinforcing strut and latching lever located in a novel manner thereon.

Another and further object of this invention is to provide a novel attaching clip or clamp for a fender shield construction.

The novel features which we believe to be characteristic of our invention are set forth with particularity in the appended claims. Our invention itself, however, both as to its organization and manner of construction, together with further objects and advantages thereof, may best be understood by reference to the accompanying drawings, in which:

Figure 1 is a front elevational view of a vehicle fender and fender shield assembly;

Figure 2 is an enlarged rear elevational view of the fender and fender shield assembly shown in Figure 1;

Figure 3 is an enlarged fragmentary sectional view taken along the line III—III of Figure 2;

Figure 4 is a sectional view through the fender and fender shield assembly as taken along the line IV—IV of Figure 2 looking down on the top of the upper attaching clip on the leading edge of the fender shield;

Figure 5 is a fragmentary elevational view of the supporting arm on the lower forward corner of the fender shield;

Figure 6 is a fragmentary sectional view taken along the line VI—VI of Figure 2 looking down on the top of the supporting arm shown in Figure 5;

Figure 7 is an enlarged rear view of the clamp at the lower rear corner of the fender shield;

Figure 8 is a vertical sectional view through the clamp as taken along the line VIII—VIII of Figure 7; and, Figure 9 is a sectional view similar to Figure 8, but showing the position of the clamp and the shield as the shield is being moved into latching engagement.

Referring now to the various figures of the drawings which illustrate one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may, indeed, be formed integral and made a part of the body itself (not shown), the fender 10 has been illustrated as being of a high crown type. The fender shield 11 is detachably mounted on the vehicle fender 10 and is positioned to cover the relatively large opening 12 in the outer side wall 13 of the fender 10 which is conventionally provided in substantially all vehicle fenders to permit access to and removal of the vehicle wheel therethrough.

In order to permit the fender shield 11 to be mounted so that its edge does not directly engage the outer depending side wall 13 of the fender 10, the fender 10 is provided with an offset shoulder 14 which is integrally connected to the depending wall 13 by a connecting flange 15. The shoulder 14 has its peripheral edge folded back on itself in an open fold as at 16 to reinforce and stiffen the offset shoulder 14 around its free edge. The extremity of the fold defined by the bent back portion 16 forms the opening defining edge 12 in the fender 10 previously referred to. The depth of the connecting flange 15 is such that when the fender shield 11 is seated on the offset shoulder 14 the outer face of the fender shield 11 extends only slightly beyond the outer depending wall 13 of the fender 10.

The lower edge of the fender 10 is provided with a rearwardly extending flat flange 17. This rearwardly extending flange 17 stiffens the forward and rear base edges 18 and 19, respectively, of the fender 10 in a conventional manner.

The fender shield 11 comprises a sheet metal panel 20 which is large enough to cover the entire wheel access opening as well as overlap the offset shoulder 14 as it is clearly shown in Figures 1 and 2. More specifically, it is dimensioned to be positioned snugly within the connecting flange 15 and to be seated on the offset shoulder 14 of the fender 10. The lower edge of the panel 20 is shaped as shown in Figures 1 and 2 of the drawings and is provided with a bent back base flange 21 to the upper side of which is secured a reinforcing bar 22 by means of rivets 23.

The top and end edges of the fender shield 11 are bent back into a flange portion 24 upon which is mounted a rubber cushioning strip 25 which may be secured or bonded thereto in any suitable manner.

The fender shield 11 is further reinforced by a brace bar or strut 26 which extends upwardly behind the panel 20 from the lower edge flange 21 to a point in proximity to the top of the fender shield 11. This strut 26 has a base portion 27 which is seated on the reinforcing bar 22 and which is riveted or bolted thereto as at 28. In order that the strut 26 may present sufficient rigidity without undue amount of metal being formed therein, it is preferably channel-shaped in cross section.

Mounted on the top of the strut 26 is a vertically adjustable plate member 29 which extends up into engagement with the rubber cushioning strip 25 at the top of the fender shield. The novel features of this strut and the novel manner in which it may be secured to the fender shield is described in detail and claimed in the co-pending application for patent of George W. Schatzman entitled "Fender shield and mounting means therefor," United States Serial No. 271,915, filed May 5, 1939, now issued as United States Letters Patent No. 2,241,043, and assigned to the same assignee as the present invention. It is sufficient for the purpose of the present application that the substantially vertically adjustable plate 29 is carried on a threaded stud 30 which extends down into a recess formed by the upper portion of the strut 26 and a strap bracket 31 which is secured to the strut 26. A pair of nuts 32 are fitted onto the threaded shank of the stud 30 and are tightened down against the top of the strut 26 to force the plate 29 upwardly into tight engagement with the rubber cushioning strip 25 on the top flange portion 24 of the fender shield 11.

It will be observed that the strut member 26 is mounted at a slight angle to the vertical, as is clearly shown in Figure 2. As will presently be pointed out this provides a mounting means for the latch lever which permits the latch lever to engage the fender opening near its rear end.

Mounted on the strut 26 is a latching arm 33 which includes a short leg portion 34 and a relatively long leg portion 35, disposed at an angle with respect to the short leg portion 34. This latching arm 33 may be conveniently mounted on the strut 26 by a mounting stud or rivet 36 carried on the strut 26. The short leg portion 34 of the latching arm 33 is shaped to engage the curled or rolled flange 16 of the fender 10 at the top rear part of the opening 12. The long leg 35 of the latching arm 33 extends downwardly to the bottom of the assembly and its lower end 37 is provided with a U-shaped bend 38 therein which extends around the lower edge flange 17 of the fender 10 and the base flange and bar 21 and 22 of the fender shield 11.

The fender shield 11 is vertically supported and laterally secured against dislodgement by a pair of fastening arms 39 and 40 at the forward end of the fender shield and by an attaching clip or latching means 41 at the trailing edge of the fender shield. It will, of course, be understood that these supporting and attaching means are in addition to the latching arm 33 hereinbefore described.

The attaching arm 39 on the forward edge of the fender shield is mounted on the rear of the fender shield 11 at the junction of the panel portion 20 and the flange 24. It is secured thereto in any suitable manner, such as by spot welding or the like. The attaching arm 39 is provided with a free end portion 42 which is so shaped as to extend around the shoulder 14 of the rolled edge 16 and to be seated on the latter. The tip 43 of the free end portion 42 flares backwardly to provide a cam surface for guiding the arm 39 into tight engagement with the rolled edge 16 of the fender 10.

The lower supporting arm 40 located on the lower portion of the fender shield 11 is riveted as at 44 to the reinforcing bar 22 and the base flange 21 of the fender shield 11. The rivets 44 cooperate with the rivets 23 and the rivets 28 of the strut assembly to retain the reinforcing bar 22 in secured engagement on the base flange 21 of the fender shield 11. The arm 40 has a free end portion 45 which is shaped to extend forwardly beyond the leading or forward edge of the fender shield as at 46 and then downwardly and forwardly as at 47. The free end portion 45 of of the arm 40 is arranged to extend through an opening 48 in the flange portion 15 of the fender 10. As an inspection of Figures 5 and 6 of the drawings will quickly show, this hooked engagement of the arm 40 through the hole 48 in the flange 15 of the fender 10 provides both a vertical support for the fender shield 11 as well as a lateral restraint. Note in Figure 5 that the tip portion 47 is seated on the flange 17 of the fender 10.

The rear edge of the fender shield 11 is supported by a spring clip or latching means 41 which may be seen best in Figures 7, 8 and 9 of the drawings. This latching mechanism or spring clip 41 has a base portion 49 which is welded or otherwise suitably secured to the under side of the base flange 21 of the fender shield 11. Rising upwardly from the base portion 49 is a pair of inner lugs 50 which merge into a bent tongue 51 which extends first vertically upwardly then obliquely downwardly as at 52 then directly rearwardly as at 53 and finally directly downwardly as at 54. Also extending up from the base 49 of the clip 41 are a pair of upper legs or ears 55 which terminate in obliquely bent back lips 56. The legs or ears 55 are arranged to bear against the base flange 17 of the fender 10. The lips 56 of the short upstanding legs 55 act as cam surfaces to guide the upright portions of the legs 55 into engagement behind the rear edge of the flange 17. It will be observed that the tip or end portion 54 of the tongue 51 extends down between the legs 50. The obliquely downwardly and forwardly bent portion 52 of the tongue 51 provides a cam surface for flexing the tongue rearwardly as the fender shield is moved upwardly (see Figure 9). The rearwardly extending portion 53 of the the tongue 51 provides a latch which is snapped over the base edge 17 of the fender 10 into the position shown in Figure 8.

To mount the fender shield 11 on the fender 10 the latching lever 33 is rocked to a position where the short leg portion 34 thereof is below the top edge of the fender shield. The leading edge of the fender shield is then moved so that the lower arm 40 is hooked through the opening 48 in the flange 15 of the fender 10. The fender shield during this movement is held in the position as shown by the dotted line in Figure 1. The shield is then rocked upwardly about the arm 40 as a pivot to cause the attaching arm 39 to be cammed into tight engagement behind the rolled edge 16. As the fender shield is being rocked up into place the spring clip 41 snaps into latched engagement by virtue of the fact that the cam portion 52 of the tongue 51 is forced rearwardly until the horizontal portion 53 snaps over the top of the base flange 17 of the fender 10. It will be observed that when the clip has been snapped into place the rear end of the fender shield is vertically supported by the portion 53 of the clip 41 while lateral displacement of the fender shield at this point is restrained by the ears 55. The latching lever 33 is now rocked into position as shown in Figure 2, or in other words, until the short leg 34 thereof is forced in behind the bent edge 16 of the fender 10. The U-shaped portion 38 at the lower end of the lever 33 is then forced over the base flange 17 of the fender 10 and the reinforcing bar 22 and base flange 21, respectively, of the fender shield 11.

To remove the fender shield 11, the lower end 37 of the latching lever 33 is grasped by the hand of the operator and forced rearwardly until the U-shaped portion 38 has become disengaged from the base edge 17 of the fender 10 and the reinforcing bar 22 and the base edge 21 of the fender shield 11. The latching lever 33 is then swung downwardly until the short leg 34 has become disengaged from the bent edge 16 of the fender 10. The lower tip 54 of the tongue 51 is then depressed rearwardly by the hand of the operator until the horizontal portion 53 has been swung free of the base edge 17. The fender shield 11 then drops down and its rear end may now be readily and quickly lifted out of its hooked engagement at the forward end of the fender shield.

While we have shown a particular embodiment of our invention, it will, of course, be understood that we do not wish to be limited thereto, since many modifications may be made, and we, therefore, contemplate by the appended claims to cover all such modifications as fall within the true spirit and scope of our invention.

We claim as our invention:

1. Securing means for attaching a fender shield on a fender and in which both fender and shield have an inturned base flange, comprising a shield supporting and latching member having a pair of spaced arms secured to the base flange of the shield, said spaced arms merging into a single body portion extending upwardly behind the base flange of the shield, then obliquely downwardly toward said shield, then rearwardly toward said upwardly extending portion, and finally terminating in a downwardly extending portion which extends below said base portion, said horizontally extending portion being arranged to be seated on the base flange of the fender thereby to hold the shield thereon, and said downwardly extending terminating portion extending between said spaced arms and located to be manually moved rearwardly thereby to free said horizontal portion from the base flange of the fender.

2. Attaching means for securing a shield having a base flange to a fender having a base flange comprising, a member having a horizontal base portion secured to the base flange of the shield, a resilient tongue arranged to be snapped over the base flange of the fender to vertically support the shield thereon, and at least one latching finger engaging the rear edge of the base flange of the fender to hold the fender shield tightly against the fender.

3. Attaching means for securing a shield having a base flange to a fender having a base flange comprising, a member having a base portion secured to the base flange of the shield, a resilient tongue arranged to be snapped over the base flange on the fender to vertically support the shield thereon, and a pair of upstanding cam fingers arranged to bear against the rear edge of the base flange of the fender to hold the shield in tight seated engagement thereon.

ARTHUR P. FERGUESON.
GEORGE W. SCHATZMAN.